United States Patent
Nolan

[11] Patent Number: 5,905,348
[45] Date of Patent: May 18, 1999

[54] POWERING AND CONTROL OF A BRUSHLESS DC MOTOR

[75] Inventor: Dennis Coyne Nolan, Montevideo, Minn.

[73] Assignee: SL Montevideo Technology, Inc., Montevideo, Minn.

[21] Appl. No.: 08/468,810

[22] Filed: Jun. 6, 1995

[51] Int. Cl.⁶ .................................................. H02P 5/06
[52] U.S. Cl. .................................... 318/254; 388/843
[58] Field of Search .................................. 318/254, 138, 318/778, 439, 327; 312/58, 61, 64, 85; 388/842–844, 904

[56] References Cited

U.S. PATENT DOCUMENTS

| | | | |
|---|---|---|---|
| 4,399,397 | 8/1983 | Kleinschmidt et al. | 322/20 |
| 4,700,117 | 10/1987 | Giebeler et al. | 318/327 |
| 4,734,634 | 3/1988 | Kito et al. | 318/778 |
| 4,743,815 | 5/1988 | Gee et al. | 318/254 |
| 4,876,491 | 10/1989 | Squires et al. | 318/138 |
| 4,928,043 | 5/1990 | Plunkett | 318/254 |
| 5,206,567 | 4/1993 | Sakurai et al. | 318/254 |
| 5,223,772 | 6/1993 | Carobolante | 318/254 |
| 5,365,153 | 11/1994 | Fujita et al. | 318/34 |

OTHER PUBLICATIONS

Micro Linear "Sensorless Spindle Motor Controller" brochure, for ML4411/ML4411A, Mar. 1993.

Primary Examiner—Jonathan Salata
Attorney, Agent, or Firm—Nixon & Vanderhye P.C.

[57] ABSTRACT

A brushless and sensorless DC motor control assembly powers a low torque to inertia ratio device such as a gyroscope or centrifuge. The assembly includes a brushless and sensorless DC motor including a rotor and three phase coils, a motor control integrated circuit, a transistor power bridge connected to the phase coils, and a microprocessor connected between and to the motor control integrated circuit and the transistor power bridge. The microprocessor directly controls the power bridge during ramp up of the motor, and after ramp up disables the power bridge and activates the integrated circuit into a closed loop operating mode until the integrated circuit is synchronized with the motor. The microprocessor also verifies synchronization and then reactivates the power bridge to effectively control which phase of the motor is energized during continued operation. The microprocessor also measures out the time interval for synchronization of the integrated circuit with the motor, and once the motor has been turned off, but while the rotor is still rotating, the microprocessor verifies the synchronization before reactivating the power bridge.

17 Claims, 6 Drawing Sheets

POWERING AND CONTROL OF A BRUSHLESS DC MOTOR

BACKGROUND AND SUMMARY OF THE INVENTION

The invention relates to a brushless and sensorless DC motor control assembly, a low torque to inertia ratio motor driven device driven by that assembly, and methods of operating a brushless and sensorless DC motor particularly with a low torque to inertia ratio device powered by the motor. The brushless and sensorless DC motor is specially configured to exhibit a large mechanical moment of inertia and operate at a very high rotational speed so that it may be used to power a motion sensing gyroscope, centrifuge, or the like. The invention utilizes a microprocessor to circumvent some of the shortcomings of brushless and sensorless DC motor controls found in the prior art.

While the benefits of brushless over brush type motors are well documented, a distinct disadvantage of the brushless motor has been the need to install semiconductor sensors within the motor so that the control electronics may be signalled as to when to commutate the motor. The addition of these sensors adds costs and complexity and reduces motor reliability.

A method of operating a brushless and sensorless DC motor without sensors has been in use in the computer industry applied to the operation of hard disk drives. An integrated circuit chip (such as the ML4410 or ML4411 manufactured by Micro Linear Corporation) is available which will constitute a complete hard disk drive with the addition of just a few external components. Prior art attempts have been made to employ the MM4410 or ML4411 in a drive for a gyroscope, but the attempts have met with limited success owing to the fundamental difference between a hard disk system and a gyroscope system. This fundamental difference can be expressed as the quotient of the available system torque over the mechanical moment of inertia (the torque to inertia ratio). It is in the nature of gyroscopic systems of this type to have a very small torque to inertia ratio as compared to a computer disk drive system.

It is this low torque to inertia ratio which has posed the main difficulty in applying the ML4410 to the control of gyroscopes. [The term "low torque to inertia ratio" when describing a DC motor powered device in the present specification and claims refers to a device that takes more than 30 seconds to accelerate from zero to rated speed at rated torque.] In order to describe exactly where the difficulties arise, a brief description of the operation of the ML4410 or ML4411 is required. The ML4410 or ML4411 typically takes the motor from a stop to operating speed via three steps:

1. ALIGNMENT—A constant current is applied to the windings in order to cause the rotor to move into alignment with the static magnetic field at a known rotational position. The motion of the rotor will be a damped torsional oscillation which comes to rest at the desired position. The amplitude, frequency, and duration of the oscillation depend on the motor torque constant, rotor inertia, rotor bearing friction, and the initial position of the rotor when the current is applied.

2. RAMP UP—The drive's three phase output is stepped in an open loop manner through the normal commutation steps starting at a low frequency (corresponding to a low motor speed) and then allowing the frequency to increase as a linear function of time (ramp up) until the frequency corresponds to the approximate minimum speed of closed loop operation.

3. CLOSED LOOP—A phase locked loop is closed allowing the commutation steps to be phase synchronized with the motor's back emf and thus to the rotor position. The motor can now be accelerated to operating speed.

In the case of a gyroscope (or other systems, e.g. centrifuges, which characteristically exhibit a low torque to inertia ratio), the alignment step may take a relatively long time (as long as ten seconds has been observed) before the rotor comes to rest. This timing is in stark contrast to the alignment times characteristic of hard drive systems, which would generally be less than one second. In the case of hard disk drives, this time period has generally been measured out using a conventional analog resistor-capacitor timing circuit. These timing circuits have not, however, been found to be very practical when the required time period extends beyond a few seconds owing to the increased physical size of the components and the decrease in the repeatability and accuracy of the circuit. The invention, replacing this circuit with a microprocessor, insures that any required time interval may be measured out with excellent accuracy and repeatability.

Systems with a low torque to inertia ratio are, by definition, capable of only very low acceleration rates. This means that during the ramp up stage the frequency must start very low and then increase very slowly so that the rate of increase does not exceed the motor's ability to accelerate and keep up with the increasing frequency. While the ML4410 or ML4411 does have a built in capacity to accomplish this frequency ramp up, it does not have sufficient range of adjustment of the frequency increase rate to reliably accommodate these systems. The prior art addresses this shortcoming by using analog switches to switch various components into and out of the ML4410 or ML4411 configuration at different stages and, although some success has been attained, the resulting systems have been found to be too expensive, too large, and not thoroughly reliable.

The invention circumvents any limitations of the ML4410 or ML4411 by eliminating it from the ramp up process altogether. Since the topology of the invention places the microprocessor between the ML4410 or ML4411 and a transistor power bridge, the microprocessor is able to take direct control of the bridge. Also, since the microprocessor is capable of producing arbitrary sequences of digital patterns (with respect to time), it can be programmed to provide the optimal ramp up sequence which will be precise and repeatable. Once the microprocessor has ramped the motor up to a sufficient speed, it activates control lines which put the ML4410 or ML4411 in closed loop operating mode and disables the bridge so that is the motor is coasting. Once the ML4410 or ML4411 has synchronized itself to the spinning motor (a condition which is verified by the microprocessor), the microprocessor reactivates the bridge, following the ML4410's or ML4411's output as to which phase should be energized.

Another advantage of the invention over the prior art is in the area of restarting the motor "on the fly". Because of the inherent high inertia and low friction of gyroscope systems, it may take on the order of ten minutes or more for the system to coast to a stop once it has been turned off. The prior art has an operational limitation in that, once the drive has been disabled, it cannot be re-enabled until the motor comes to a stop. In use this has been found to be an undesirable limitation since it can cause long delays if it is found that the equipment is needed again just after it has been shut down. The reason that the prior art exhibits this limitation is that it has no means for checking to assure that the ML4410 or ML4411 has retained synchronization with the motor while the power bridge has been off. If the power bridge were to be re-enabled while the motor was spinning at high speed and the drive was not properly synchronized with the motor, it is highly likely that some of the large energy reservoir stored in the spinning inertia of the motor would be converted into high fault currents which would destroy transistors in the bridge. The invention, however, employs a software routine within the microprocessor to assure that synchronization has been retained (as is normally the case) before the bridge is re-enabled. Only in the unlikely event that synchronization has been lost will the microprocessor then hold off re-enabling of the bridge until the motor comes to a stop, at which time the ALIGNMENT stage is entered.

According to one aspect of the present invention a brushless and sensorless DC motor control assembly is provided comprising the following components: A brushless and sensorless DC motor including a rotor and a plurality of phase coils. A motor control integrated circuit. A transistor power bridge connected to the plurality of phase coils. And, a microprocessor connected between and to the motor control integrated circuit and the transistor power bridge for: directly controlling the power bridge during ramp up of the motor; after ramping up, disabling the power bridge and activating the integrated circuit into a closed loop operating mode until the integrated circuit is synchronized with the motor, and verifying the synchronization; and then re-activating the power bridge, the integrated circuit and power bridge controlling which phase of the motor is energized during continued operation.

The assembly is typically in combination with a device (such as a gyroscope or a centrifuge) powered by the motor having a low torque to inertia ratio (i.e. taking more than 30 seconds to accelerate from zero to a rated speed at rated torque). The microprocessor typically also measures out the time interval for synchronization of the integrated circuit with the motor. After the motor has been turned off, but while the rotor is still rotating, the microprocessor verifies synchronization between the integrated circuit and the motor before reactivating the power bridge.

The motor normally comprises three phase coils and the transistor power bridge typically comprises a DC power supply and three pairs of transistors, each pair of transistors connected to one of the motor phase coils. The motor control integrated circuit preferably comprises an ML4410 or ML4411, however present and future alternative motor control integrated circuits which provide complete commutation for Delta or Wye wound brushless motors without the need for signals from Hall effect sensors may be provided.

The invention also relates to a low torque to inertia ratio motor driven device comprising the following components: A centrifuge or gyroscope. A brushless and sensorless DC motor including a rotor and three phase coils, for powering the centrifuge or gyroscope. A motor control integrated circuit. And, a microprocessor connected between and to the motor control integrated circuit and motor for controlling the motor. The device may further comprise a transistor power bridge connected between the microprocessor and the motor, the transistor power bridge comprising a DC power supply and three pairs of transistors, each pair of transistors connected to one of the motor phase coils.

The invention also relates to a method of operating a brushless and sensorless DC motor, such as described above. The method comprises the steps of: While the rotor is rotating, turning the motor off; and while the rotor is still rotating, restarting the motor by using the microprocessor to verify synchronization between the integrated circuit and the motor, and once verification has been established, reactivating the power bridge.

According to yet another aspect of the invention, the invention comprises a method of operating a device having a low torque to inertia ratio and powered by a brushless and sensorless DC motor such as described above. The method comprises the steps of: Directly controlling the power bridge with the microprocessor to effect ramp up of the motor. After ramping up, with the microprocessor disabling the power bridge and activating the integrated circuit into a closed loop operating mode until the integrated circuit is synchronized with the motor, and verifying the synchronization. And then with the microprocessor, re-activating the power bridge, so that the integrated circuit and power bridge control which phase of the motor is energized during continued operation.

The method typically comprises the further step of, with the microprocessor, measuring out the time interval for synchronization of the integrated circuit with the motor. The method also typically comprises the further steps of: turning off the motor; and after the motor has been turned off, but while the rotor is still rotating, with the microprocessor verifying synchronization between the integrated circuit and the motor before re-activating the power bridge.

It is the primary object of the present invention to provide powering of a low torque to inertia ratio device utilizing a brushless and sensorless DC motor. This and other objects of the invention will become clear from an inspection of the detailed description of the invention, and from the appended claims.

DETAILED DESCRIPTION OF THE DRAWINGS

Figure 1:
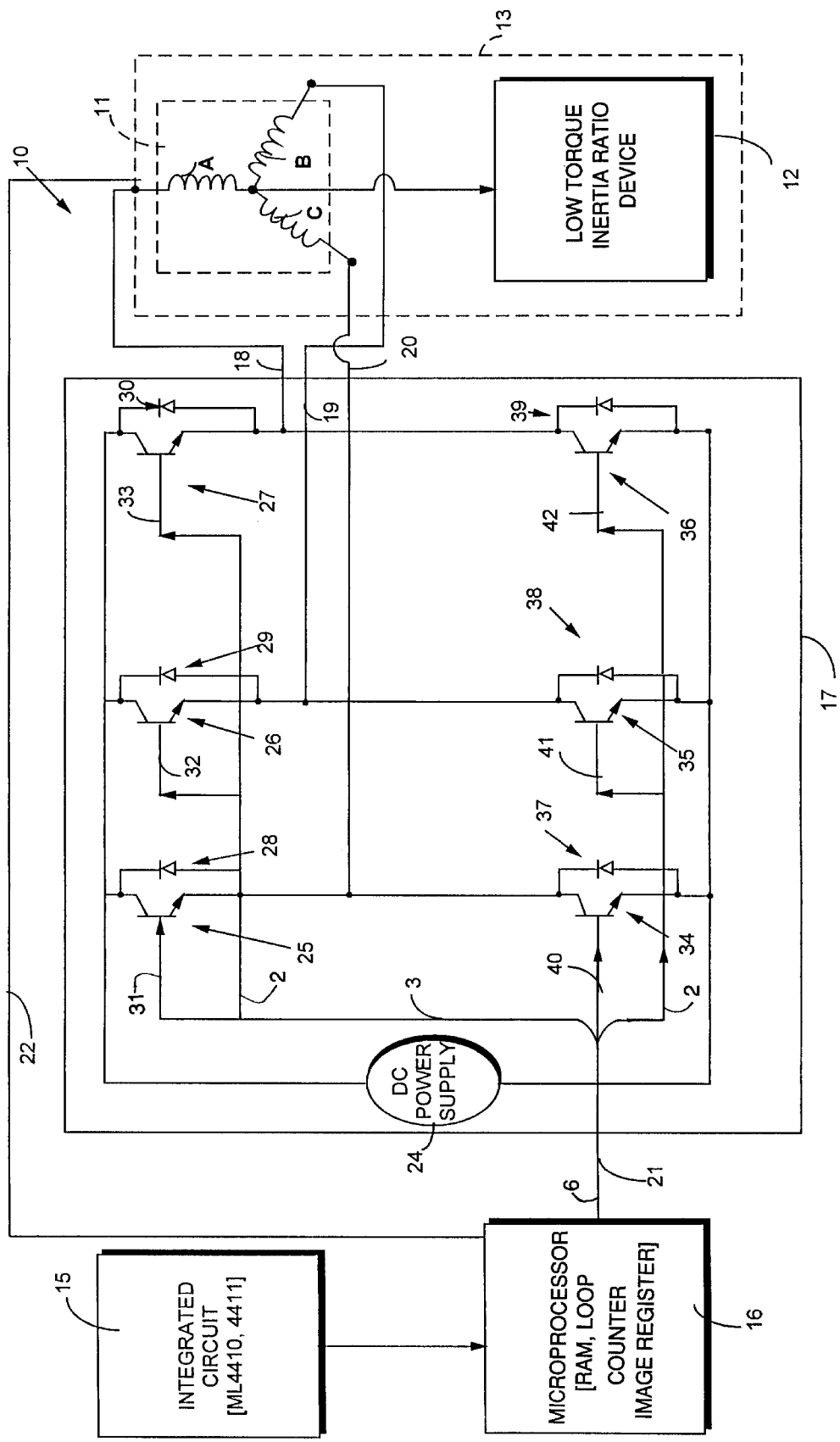
FIG. 1 is a schematic showing the major exemplary components of an assembly according to the present invention.

An exemplary assembly according to the present invention is shown generally by reference numeral 10 in FIG. 1. The assembly includes a brushless and sensorless DC motor shown generally and schematically at 11, which has a plurality of phase coils, in the illustrated embodiment three phase coils A, B, and C. The motor 11 is designed to power a low torque/inertia ratio device 12. A low torque/inertia ratio device is one that takes more than 30 seconds to accelerate from zero to rated speed at rated torque. Common examples are gyroscopes (e.g. motion sensing gyroscopes which may be associated with cameras), and centrifuges. The components 11, 12 will typically be intimately mounted together, as indicated schematically at 13 in FIG. 1.

The assembly 10 also comprises a motor control integrated circuit 15. Two commercially available integrated circuits that are suitable for the circuit 15 are the ML4410 and ML4411 available from Micro Linear Corporation of San Jose, Calif. While the ML4410 and ML4411 are eminently suited for use as integrated circuit 15 in the assembly 10 any other motor controller which provides complete commutation for Delta or Wye wound brushless DC motors without the need for signal Hall effect sensors may be utilized.

The assembly 10 further comprises a microprocessor 16 of any conventional construction. The microprocessor 16 inherently includes random access memory [RAM], a loop counter, and an image register, among other components.

The integrated circuit 15 is connected to the microprocessor 16, while a transistor power bridge 17 is connected between the motor 11 and the microprocessor 16. The transistor power bridge 17 includes three outputs 18, 19, and 20, connected to the motor phase coils A, B, and C, respectively. A control input line 21 is provided from the microprocessor 16 to the power bridge 17, and preferably a sense line 22 is provided between the winding phase A of the motor 11 and the microprocessor 16.

The power bridge 17 includes a DC power supply 24, and a first set of a plurality (corresponding to the number of phases of the motor 11, in this case three) of transistors indicated schematically at 25, 26, and 27 in FIG. 1, with a diode 28, 29, 30, respectively connected across each of the transistors 25–27. Control input 31 is provided to the base of the transistor 25, control input 32 to the base of the transistor 26, and control input 33 to the base of the transistor 27.

The power bridge 17 also comprises a second set of transistors 34–36, with connected diodes 37–39, formed in pairs with the transistors 25–27. The controls 40, 41 and 42 extend, respectively, to the bases of the transistors 34–36. The transistor pair 27, 36 is operatively connected to the output 18 to phase coil A, transistors 26, 35 are operatively connected to output 19 to phase coil B, and transistors 27, 36 are operatively connected to output 20 to phase coil C.

Figure 2:
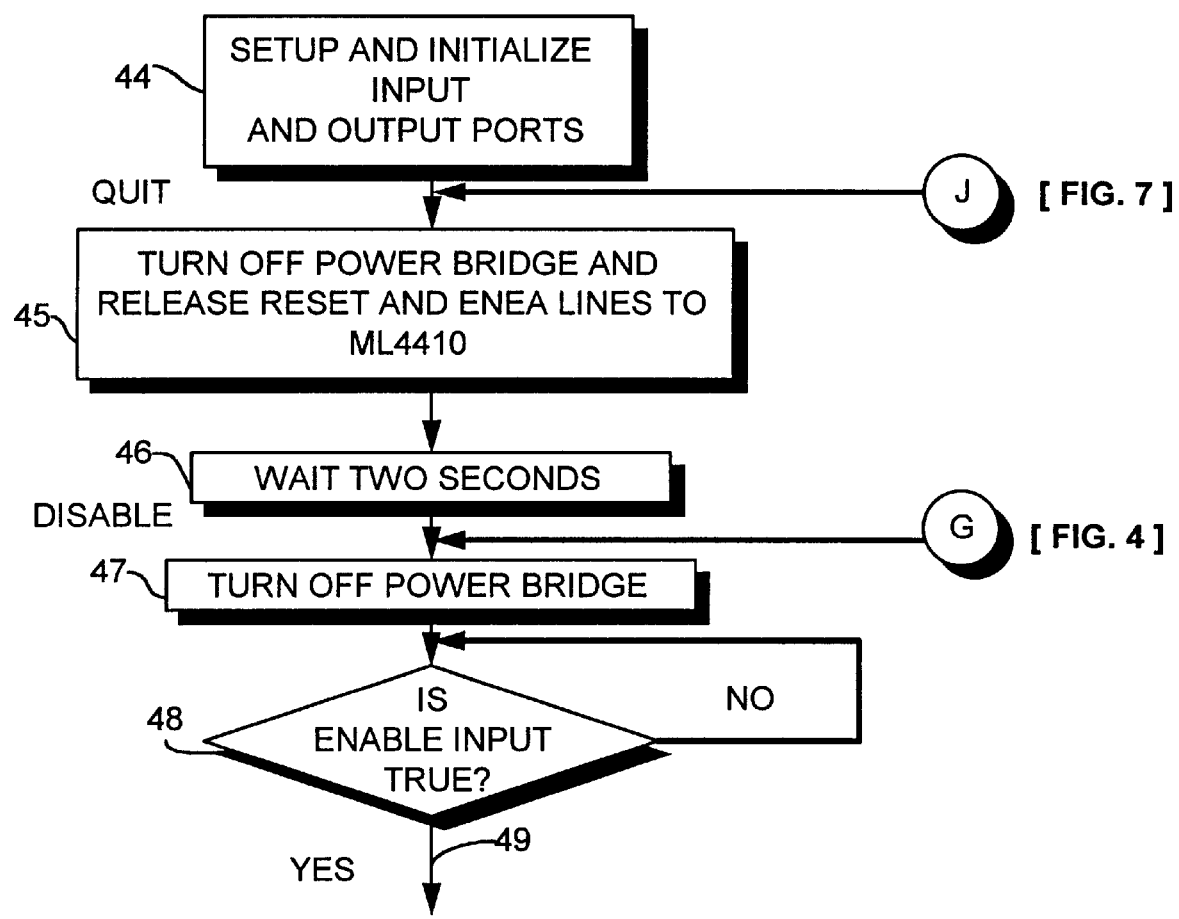
FIG. 2 is a high level flow sheet indicating an exemplary initialization of the components of FIG. 1 via microprocessor control.

FIG. 2 illustrates schematically the control steps provided by the software for controlling the microprocessor 16 for initialization. As indicated by control box 44, first the input and output ports of the microprocessor 16 are initialized, then as indicated at 45 the power bridge 17 is turned off, the release is reset, and logic (ENEA) is implemented that enables the integrated circuit 15 (e.g. ML4410) error amp and closes the back-emf loop. After a time delay as indicated by box 46, the power bridge 17 is again turned off as indicated at 47, and decision box 48 indicates that the ENABLE input is evaluated. If not true the decision function is implemented again, but if true control proceeds to line 49. Input J provided between boxes 44, 45 originates in FIG. 7 while input G between boxes 46, 47 originates in FIG. 4.

Figure 3:
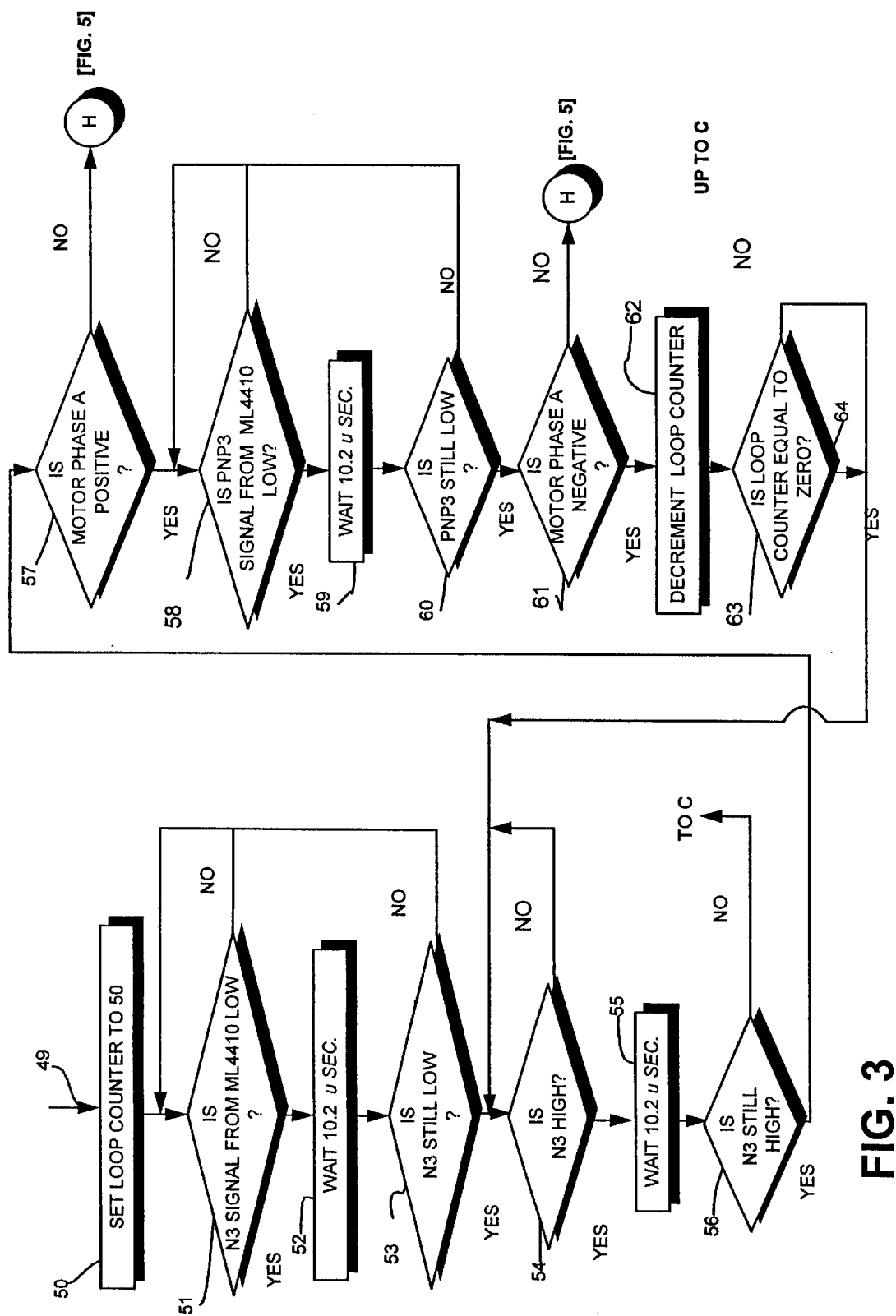
FIG. 3 is a high level flow sheet indicating an exemplary synchronization check function accomplished by the microprocessor of the assembly of FIG. 1.

FIG. 3 illustrates a synchronization check function performed by the software for the microprocessor 16, starting with input line 49. Box 50 indicates that the loop counter within the microprocessor 16 is set and then an evaluation is made as indicated at decision box 51 as to whether or not the N3 signal from the integrated circuit 15 is low. [Note that N1, N3, PNP1, and PNP 3, taken as binary code, indicate which of the six commutation steps the integrated circuit 15 is calling for.] If it is low there is a time delay as indicated by box 52, and then another decision is made at 53. If yes again then in decision box 54 an evaluation is made as to whether the N3 signal is high, there is another time delay as indicated by box 55, and another evaluation as to whether it is still high indicated by decision box 56. Then at decision box 57 a decision is made whether the motor phase A is positive [the sense line 22 connected between the phase coil A and the microprocessor 16 to provide data in this regard]. If it is not control proceeds to routine H in FIG. 5, while if it is a decision is made at block 58 whether the PNP3 signal from the integrated circuit 15 is low.

After decision box 58 there is a delay as indicated at 59, another evaluation at 60, and still another evaluation at 61 before the loop counter within the microprocessor 16 is decremented as indicated by box 62. Finally, for the synchronization check, an evaluation is made in decision block 63 as to whether the loop counter is equal to zero, and if yes control proceeds to line 64.

Figure 4:
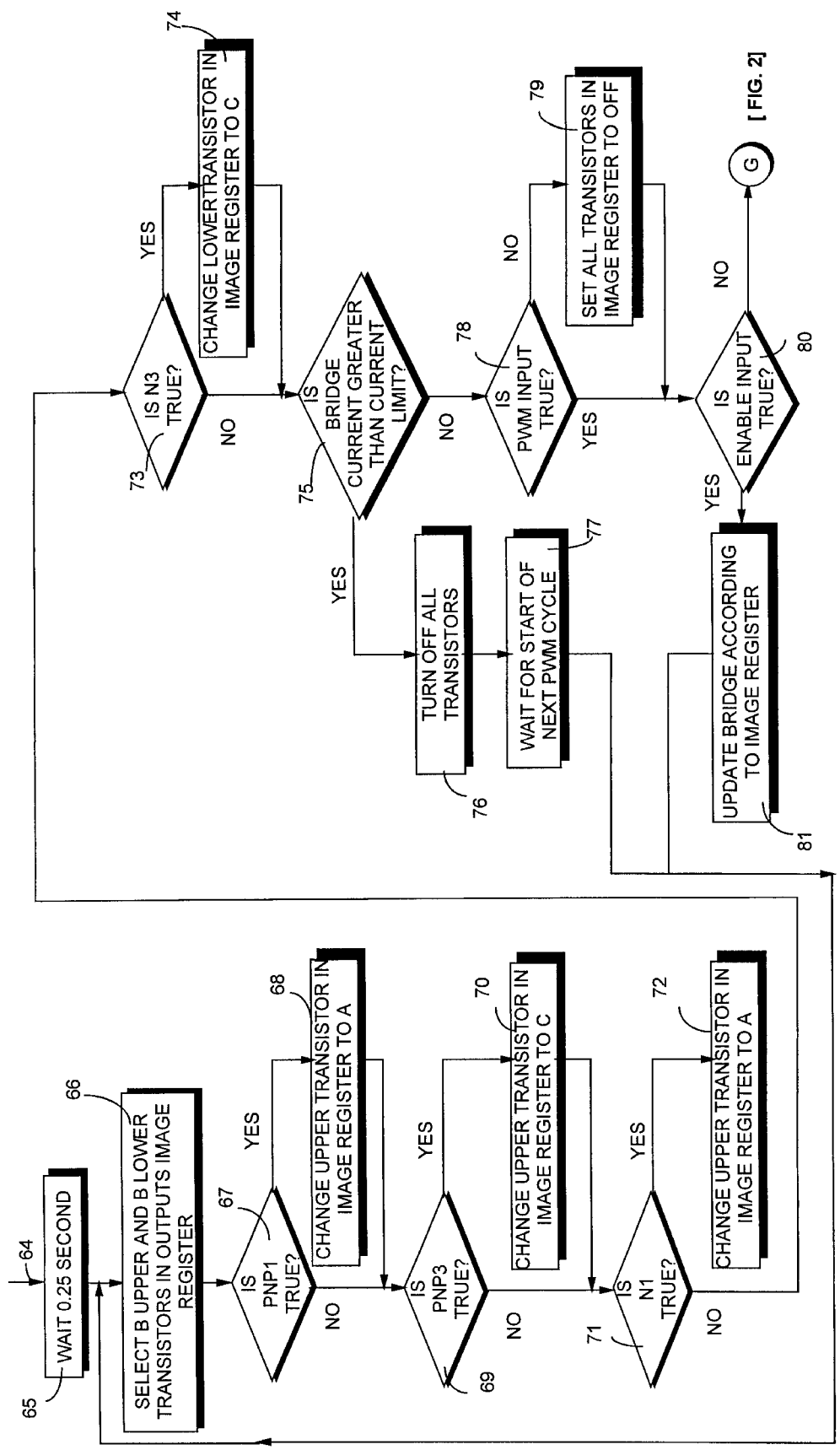
FIG. 4 is a high level flow sheet indicating an exemplary motor commutation sequence for the motor of FIG. 1 utilizing the integrated circuit of FIG. 1.

FIG. 4 illustrates the software control for the commutation function per the integrated circuit 15. From line 64 there is first a delay as indicated by box 65, and then as indicated at box 66 the transistors and the outputs of the image register (in microprocessor 16) are selected. If PNP1 is true as indicated by decision box 67, then the upper transistor in the image register is changed to A as indicated at 68; if PNP3 is true as evaluated in decision box 69, then as indicated by box 70 the upper transistor is changed in the image register to C. The same evaluations are made for N1 and N3 as indicated by decision boxes 71, 73 with the yes controls indicated by boxes 72, 74, and then at decision box 75 an evaluation is made as to whether the bridge current is greater than the current limit. If it is then all of the transistors in the power bridge 17 are turned off as indicated by box 76 and there is a wait for the start of the next pulse with modulator output (associated with the speed regulator) cycle as indicated at 77. If the decision from decision block 75 is no, then a decision is made at 78 as to whether the pulse with modulator input is true. If no then all the transistors in the image register of the microprocessor 16 are set to "off" as indicated at 79, then an evaluation is made at 80 as to whether the ENABLE input is true. If it is then the power bridge 17 is updated according to the image register as indicated at 81, and if not then control passes to input G, that is back to FIG. 2.

Figure 5:
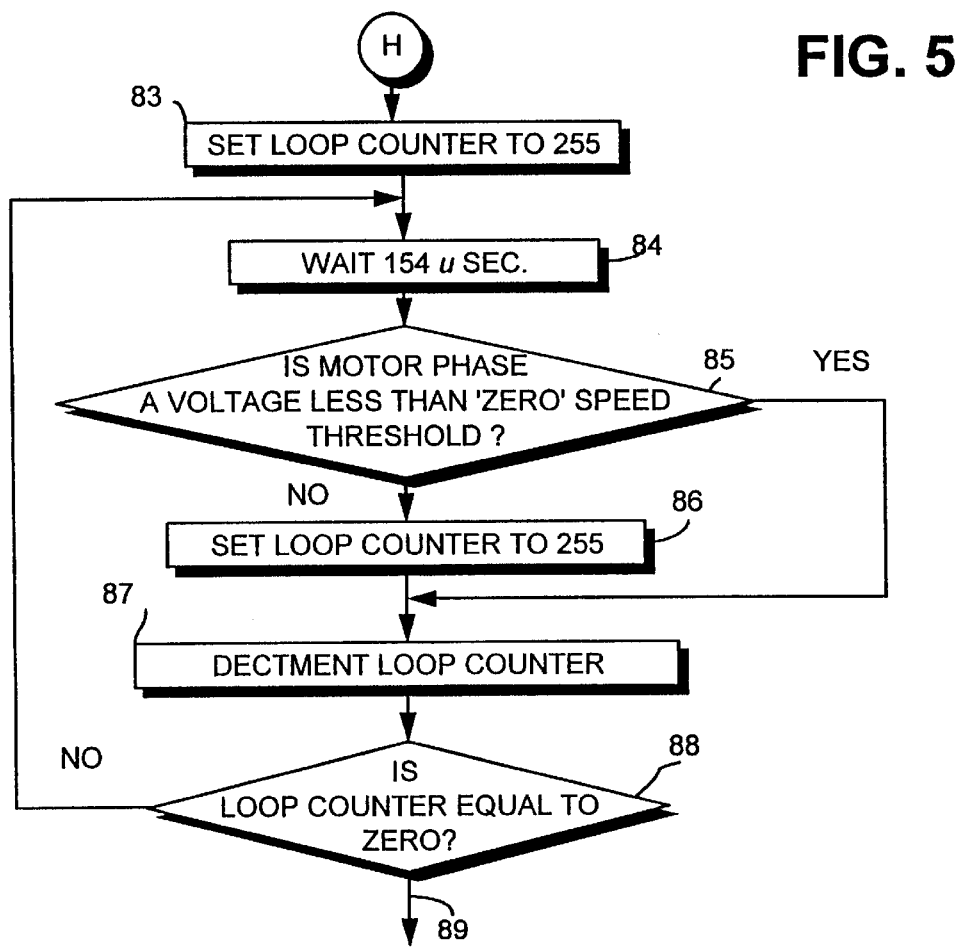
FIG. 5 is a high level schematic indicating an exemplary "zero" speed check control function of the microprocessor of FIG. 1.

FIG. 5 indicates a "zero speed check" function, which assures that the motor speed is below an arbitrary low threshold. In this sequence first the loop counter in the microprocessor 16 is set as indicated at 83, there is a delay as indicated at 84, and then decision is made at 85 regarding the motor phase A voltage. If yes the loop counter set function indicated by box 86 is bypassed, and ultimately the loop counter is decremented as indicated at 87 and then decision is made at 88 as to whether the loop counter is equal to zero. If it is then control proceeds to line 89.

Figure 6:
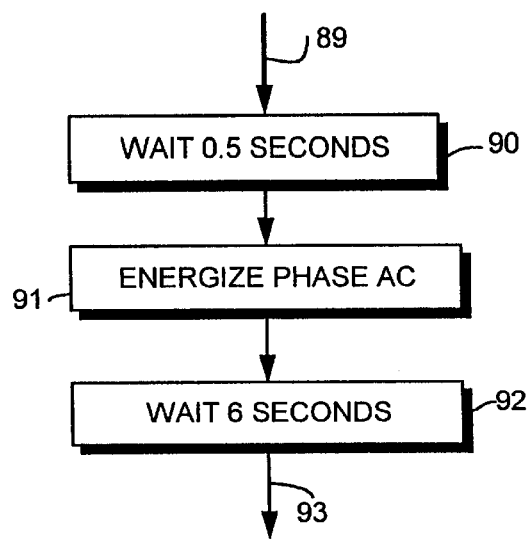
FIG. 6 is a high level flow sheet indicating an exemplary control of the microprocessor of FIG. 1 to effect an alignment function.

FIG. 6 illustrates schematically illustrates the alignment function, the input being provided from line 89. First there is a delay as indicated by box 90, then phase AC is energized as indicated at 91, and then another delay as indicated at 92, providing control in line 93.

Figure 7:
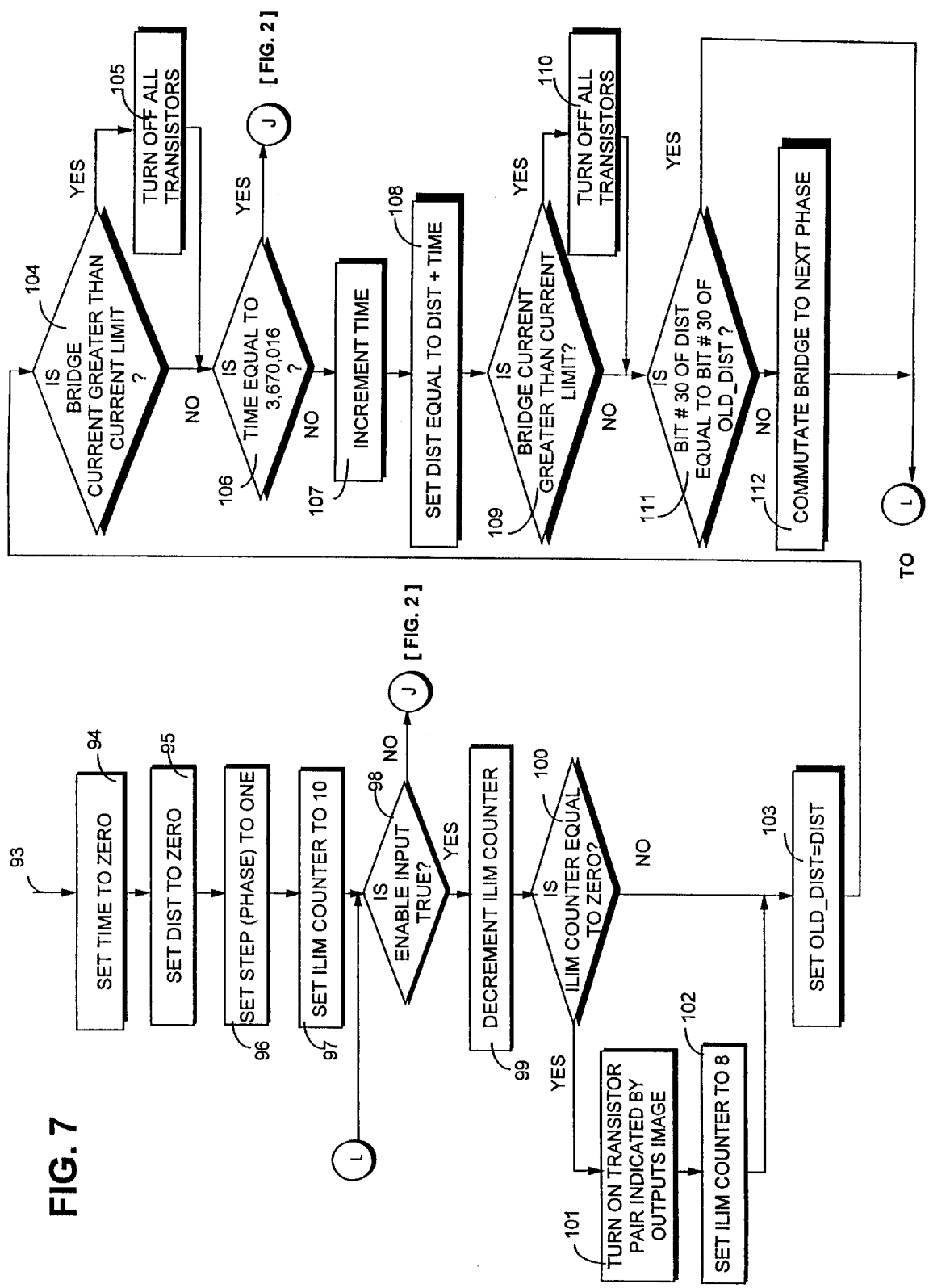
FIG. 7 is a high level flow sheet indicating an exemplary control sequence of the microprocessor to provide smooth ramp-up.

FIG. 7 indicates the smooth ramp-up function software control of the microprocessor 16, starting with input 93. First the time and distance are set to zero as indicated at 94, 95 then the operations 96, 97 are carried out. [The ILIM counter of the microprocessor is used to set the modulation frequency of the power bridge 17.] If the ENABLE input is not true then the control is looped back to between boxes 44, 45 in FIG. 2. If it is true control proceeds to the decrement step 99 in decision block 100. If the decision in block 100 is yes then the transistor pair in the power bridge 17 indicated by the outputs images turned on as indicated at 101, and the ILIM counter is set as indicated at 102. The nomenclature DIST in box 103 is calculated rotational displacement during ramp-up, while OLD.DIST is the rotational displacement calculated on the previous calculation pass. Then an evaluation is made at 104 with respect to the power bridge 17 current and if it is over the current number then all of the transistors 25–27 and 34–36 in power bridge 17 are turned off by controlling the main control 21. If that aberrant condition does not exist then an evaluation is made in decision block 106 regarding the ramp-up time interval (typically about 4–5 seconds). A yes decision from box 106 causes return to between boxes 44 and 45 in FIG. 2 while a no decision results in the practice of the steps in boxes 107 and 108. Boxes 109, 110 make the same evaluation and effect the same control as was made at 104, 105, and with a no decision from decision block 111 the power bridge 17 is commutated to the next phase (e.g. phase B) as indicated by box 112, completing smooth ramp-up.

It will thus be seen that according to the present invention a method and apparatus are provided which have a number of advantages compared to the prior art. By using the microprocessor 16 to control timing, any required time interval may be measured out with excellent accuracy and repeatability, enhancing alignment capabilities and efficiencies. Other advantages are obtained by eliminating the integrated circuit 15 from the ramp-up process altogether, and by allowing restarting of the motor 11 "on the fly" which is important when controlling devices like gyroscopes which take an inordinately long time to coast to a stop once turned off.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent assemblies and methods.

What is claimed is:

1. A brushless and sensorless DC motor control assembly, comprising:
    a device having a low torque to inertia ratio:
    a brushless and sensorless DC motor driving said low torque to inertia ratio device, said DC motor including a rotor and a plurality of phase coils;
    a motor control integrated circuit;
    a transistor power bridge connected to said plurality of phase coils; and
    a microprocessor connected between and to said motor control integrated circuit and said transistor power bridge for: directly controlling said power bridge during ramp up of said motor; after ramping up, disabling said power bridge and activating said integrated circuit into a closed loop operating mode until said integrated circuit is synchronized with said motor, and verifying said synchronization; and then re-activating said power bridge, said integrated circuit and power bridge controlling which phase of said motor is energized during continued operation.

2. An assembly as recited in claim 1 wherein after said motor has been turned off, but while said rotor is still rotating, said microprocessor verifies synchronization between said integrated circuit and said motor before re-activating said power bridge.

3. An assembly as recited in claim 1 wherein said device comprises a gyroscope or a centrifuge.

4. An assembly as recited in claim 1 wherein said motor comprises three phase coils, and wherein said transistor power bridge comprises a DC power supply and three pairs of transistors, each pair of transistors connected to one of said motor phase coils.

5. An assembly as recited in claim 4 wherein said motor control integrated circuit comprises an ML4410 or ML4411.

6. An assembly as recited in claim 1 wherein said motor control integrated circuit comprises an ML4410 or ML4411.

7. An assembly as recited in claim 1 wherein said microprocessor measures out the time interval for synchronization of said integrated circuit with said motor.

8. An assembly as recited in claim 7 wherein after said motor has been turned off, but while said rotor is still rotating, said microprocessor verifies synchronization between said integrated circuit and said motor before re-activating said power bridge.

9. A method of operating a brushless and sensorless DC motor for driving a low torque to inertia ratio device, the DC motor including a rotor and a plurality of phase coils, using a motor control integrated circuit, a transistor power bridge connected to said plurality of phase coils, and a microprocessor, the method comprising the steps of:
    while the rotor is rotating, turning the motor off; and
    while the rotor is still rotating, restarting the motor by using the microprocessor to verify synchronization between the integrated circuit and the motor, and once verification has been established, reactivating the power bridge.

10. A method of operating a device having a low torque to inertia ratio and powered by a brushless and sensorless DC motor including a rotor and a plurality of phase coils, using a motor control integrated circuit, a transistor power bridge connected to the plurality of phase coils, and a microprocessor, comprising the steps of:
    directly controlling the power bridge with the microprocessor to effect ramp up of the motor;
    after ramping up, with the microprocessor disabling the power bridge and activating the integrated circuit into a closed loop operating mode until the integrated circuit is synchronized with the motor, and verifying the synchronization; and then
    with the microprocessor, re-activating the power bridge, so that the integrated circuit and power bridge control which phase of the motor is energized during continued operation.

11. A method as recited in claim 10 comprising the further step of, with the microprocessor, measuring out the time interval for synchronization of the integrated circuit with the motor.

12. A method as recited in claim 11 comprising the further steps of: turning off the motor; and after the motor has been turned off, but while the rotor is still rotating, with the microprocessor verifying synchronization between the integrated circuit and the motor before re-activating the power bridge.

13. A method as recited in claim 10 comprising the further steps of: turning off the motor; and after the motor has been turned off, but while the rotor is still rotating, with the microprocessor verifying synchronization between the integrated circuit and the motor before re-activating the power bridge.

14. A method as recited in claim 10 wherein the low torque to inertia ratio device comprises a gyroscope or a centrifuge.

15. A low torque to inertia ratio motor driven device, comprising:
   a centrifuge or gyroscope;
   a brushless and sensorless DC motor including a rotor and three phase coils, for powering said centrifuge or gyroscope;
   a motor control integrated circuit; and
   a microprocessor connected between and to said motor control integrated circuit and motor for controlling said motor.

16. A device as recited in claim 15 further comprising a transistor power bridge connected between said microprocessor and said motor, said transistor power bridge comprises a DC power supply and three pairs of transistors, each pair of transistors connected to one of said motor phase coils.

17. An assembly as recited in claim 15 wherein said motor control integrated circuit comprises an ML4410 or ML4411.

* * * * *